United States Patent
Lee

(10) Patent No.: US 11,244,138 B2
(45) Date of Patent: Feb. 8, 2022

(54) HOLOGRAM-BASED CHARACTER RECOGNITION METHOD AND APPARATUS

(71) Applicant: Jin Woo Lee, Seoul (KR)

(72) Inventor: Jin Woo Lee, Seoul (KR)

( * ) Notice: Subject to any disclaimer, the term of this patent is extended or adjusted under 35 U.S.C. 154(b) by 0 days.

(21) Appl. No.: 16/727,001

(22) Filed: Dec. 26, 2019

(65) Prior Publication Data

US 2020/0210675 A1 Jul. 2, 2020

(30) Foreign Application Priority Data

Dec. 28, 2018 (KR) .................. 10-2018-0171529

(51) Int. Cl.

| | | |
|---|---|---|
| *G06F 3/01* | (2006.01) | |
| *G06K 9/00* | (2006.01) | |
| *G03H 1/22* | (2006.01) | |
| *G06F 3/0488* | (2013.01) | |

(52) U.S. Cl.
CPC ....... *G06K 9/00026* (2013.01); *G03H 1/2249* (2013.01); *G06F 3/018* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 2011/0175816 A1* | 7/2011 | Shin ................. | G06F 3/04883 345/168 |
| 2013/0033447 A1* | 2/2013 | Cho ................... | G06F 3/018 345/173 |

(Continued)

FOREIGN PATENT DOCUMENTS

| | | |
|---|---|---|
| KR | 10-2004-0016365 A | 2/2004 |
| KR | 10-2011-0088969 A | 8/2011 |

(Continued)

OTHER PUBLICATIONS

Korean Office Action dated May 25, 2020 issued in corresponding Korean Patent Application No. 10-2018-0171529.

*Primary Examiner* — Joseph R Haley
(74) *Attorney, Agent, or Firm* — Bacon & Thomas, PLLC

(57) ABSTRACT

A hologram-based character recognition method in which representative characters are respectively matched to fingers and a group of characters including character objects is matched to representative characters, includes: displaying, when a first movement of a predetermined finger is detected, in a space a hologram image in which a predetermined representative character among the representative characters matched to the predetermined finger is arranged at a center and the character objects included in the group matched to the predetermined representative character are arranged around the predetermined representative character. The method further includes: recognizing the predetermined representative character as an input when a second movement of the predetermined finger is detected; and recognizing one of the one or more character objects as an input when the second movement of the predetermined finger is detected after the predetermined finger is dragged or moved to said one of the one or more character objects.

12 Claims, 11 Drawing Sheets

(56) References Cited

U.S. PATENT DOCUMENTS

| | | | | |
|---|---|---|---|---|
| 2015/0121287 A1* | 4/2015 | Fermon | ................... | G06F 3/017 |
| | | | | 715/773 |
| 2015/0268730 A1* | 9/2015 | Walline | ................. | G06F 3/0393 |
| | | | | 345/168 |
| 2016/0349926 A1* | 12/2016 | Okumura | .............. | G06F 3/0346 |

FOREIGN PATENT DOCUMENTS

| KR | 10-1411569 B | 6/2014 |
|---|---|---|
| KR | 10-2014-0147747 A | 12/2014 |

\* cited by examiner

HOLOGRAM-BASED CHARACTER RECOGNITION METHOD AND APPARATUS

TECHNICAL FIELD

The present disclosure relates to a character recognition technique, and more particularly, to a hologram-based character recognition method and apparatus capable of recognizing input characters by associating motion recognition of each finger that matches a representative character or a character object to each finger with a hologram image.

BACKGROUND

As is known, most portable information devices, such as portable terminals (e.g., smart watches, mobile phones, smart phones, smart devices, navigation, watch phones, wearable devices, etc.) generally have a small touch-type keypad (touch panel). Such small keypads are increasingly being used for various types of data processing using memos and portable information devices as well as conventional short text (SMS) inputs.

Currently, the character input method using a small keypad can be largely divided into a qwerty keyboard method and a method using a 3×4 keyboard or a modified method thereof. Although there is an advantage in that the qwerty keyboard displays all characters on the keyboard so that the keyboard can be input by one touch, the area of the keyboard assigned to one character is small, causing a lot of input errors.

In particular, there is a problem that it is very difficult to enter characters using a small keypad in the case of people with a physical disability who is somewhat inconvenient to use the hand.

SUMMARY

In view of the above, the present disclosure provides a hologram-based character recognition method and apparatus capable of recognizing input characters by associating motion recognition of each finger that matches a representative character or a representative object to each finger with a hologram image.

The present disclosure provides a computer-readable recording medium having a computer program stored therein for a processor to perform a hologram-based character recognition method.

The present disclosure provides a computer program stored in a computer-readable recording medium for a processor to perform a hologram-based character recognition method.

The problems to be solved by the present disclosure is not limited to the above; and another problem to be solved that is not mentioned will be clearly understood by those skilled in the art from the following description.

In accordance with a first aspect of the present disclosure, there is provided a hologram-based character recognition method in which one or more representative characters are respectively matched to one or more fingers and a group of characters including one or more character objects is matched to each of the one or more representative characters, the hologram-based character recognition method including: displaying, when a first movement of a predetermined finger among the one or more fingers is detected, in a space a hologram image in which a predetermined representative character among the one or more representative characters matched to the predetermined finger is arranged at a center of the hologram image and the one or more character objects included in the group matched to the predetermined representative character are arranged around the predetermined representative character; recognizing the predetermined representative character as an input when a second movement of the predetermined finger is detected; and recognizing one of the one or more character objects as an input when the second movement of the predetermined finger is detected after the predetermined finger is dragged or moved to said one of the one or more character objects.

The second movement may be a spreading movement of the predetermined finger, when the first movement is a bending movement of the predetermined finger.

The hologram-based character recognition method may further include displaying a detection of the second movement by a change of a color or an unevenness of the hologram image when the second movement is detected.

The hologram image may have a circular structure or a rectangular structure.

The predetermined representative character or the one or more character objects recognized as an input may be displayed in a character output area arranged in a predetermined portion of the hologram image.

A representative function key is matched to one of the fingers, and a function key group including at least one function key object may be matched to the representative function key.

In accordance with a second aspect of the present disclosure, there is provided a hologram-based character recognition method in which one or more representative objects including a representative character object and a representative function key object are respectively matched to one or more fingers, a character group including remaining character objects is matched to the representative character object, and a function key group including remaining function key objects is matched to the representative function key object, the hologram-based character recognition method including: displaying in a space a hologram image in which, when a first movement of a predetermined finger is detected, a predetermined representative object among the one or more representative objects matched to a predetermined finger among the one or more fingers is arranged at a center of the hologram image and a plurality of annular ring are arranged around the predetermined representative object, and remaining objects corresponding to the predetermined representative object are arranged in the annular ring; recognizing the predetermined representative character as an input when a second movement of the predetermined finger is detected; and recognizing one of the remaining objects as the input when the second movement of the predetermined finger is detected after the predetermined finger is dragged or moved to said one of the remaining objects.

The representative character object may include at least one of a representative object of Korean consonants and a representative object of Korean vowels.

The second movement may be a spreading movement of the predetermined finger, when the first movement is a bending movement of the predetermined finger.

The predetermined representative object or the one of the remaining objects recognized as the input may be displayed in a character output area arranged in a predetermined portion of the hologram image.

In accordance with a third aspect of the present disclosure, there is provided a hologram-based character recognition method in which one or more objects in each column or each row constituting a qwerty keyboard are respectively matched to one or more fingers as representative objects, and groups of objects including the remaining objects in each column or each row are respectively matched to the representative objects, the hologram-based character recognition method including: displaying, when a first movement of a predetermined finger is detected, in a space, a hologram image in which a predetermined representative object matched to the predetermined finger and a plurality of objects belonging to a group of objects matched to the predetermined representative character are arranged in the form of the qwerty keyboard; recognizing the predetermined representative object as an input when a second movement of the predetermined finger is detected; and recognizing one of the plurality objects as the input when the second movement of the predetermined finger is detected after the predetermined finger is dragged or moved to the one of the plurality objects.

The second movement may be a spreading movement of the predetermined finger, when the first movement is a bending movement of the predetermined finger.

The predetermined representative object or the one of the plurality objects recognized as the input by the second movement may be displayed in a character output area arranged in a predetermined portion of the hologram image.

In accordance with a fourth aspect of the present disclosure, there is provided a hologram-based character recognition method in which objects in each row of a qwerty keyboard are respectively divided into a first part and a second part, one object of the first part is matched to one finger of a left hand as a first representative object, a first object group including the other objects of the first part is matched to the first representative object, and one object of the second part is matched to one finger of a right hand as a second representative object, and a second object group including the other objects of the second part is matched to the second representative object, the hologram-based character recognition method including: displaying, when a first movement of a predetermined finger of the left or right hand is detected, in a space, a hologram image in which a predetermined representative object among the first representative objects and the second representative objects matched to the predetermined finger and a plurality of objects belonging to a object group among the first object groups and the second object groups matched to the predetermined representative object are arranged in the form of the qwerty keyboard; recognizing the predetermined representative object as an input when a second movement of the predetermined finger is detected; and recognizing one object among the plurality of objects as an input when the second movement of the predetermined finger is detected after the predetermined finger is dragged or moved to the one object among the plurality of objects.

The second movement may be a spreading movement of the predetermined finger, when the first movement is a bending movement of the predetermined finger.

The predetermined representative object or the one object recognized as the input by the second movement may be displayed in a character output area arranged in a predetermined portion of the hologram image.

In accordance with the embodiments of the present disclosure, by recognizing the input character by associating the motion recognition of each finger that matches the representative character or the representative object to each finger with the hologram image, it is possible to realize inputting fast character and reducing error of character input while providing intuition of relatively excellent character input in a space rather than the conventional planar keyboard.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present invention, if it is determined that detailed description of related known components or functions unnecessarily obscures the gist of the present invention, the detailed description thereof will be omitted. Further, the terminologies to be described below are defined in consideration of functions of the embodiments of the present invention and may vary depending on a user's or an operator's intention or practice. Accordingly, the definition thereof may be made on a basis of the content throughout the specification.

Hereinafter, embodiments of the present invention will be described in detail with reference to the accompanying drawings.

Figure 1:
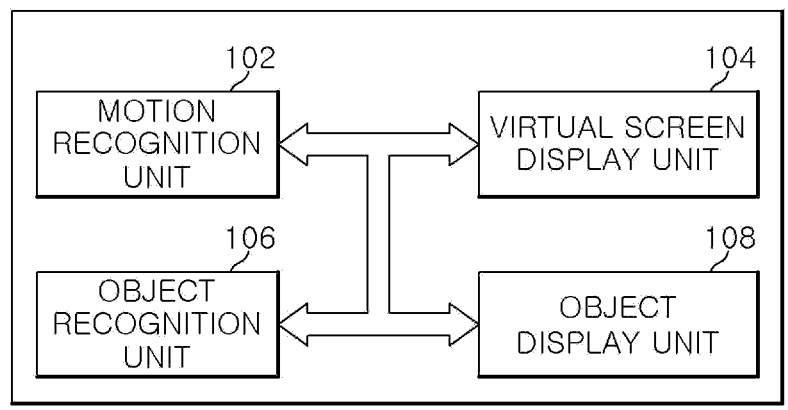
FIG. 1 is a block diagram illustrating a hologram-based character recognition apparatus in accordance with various embodiments of the present disclosure.

FIG. 1 is a block diagram illustrating a hologram-based character recognition apparatus in accordance with various embodiments of the present disclosure.

Referring to FIG. 1, a hologram-based character recognition apparatus in accordance with various embodiments of the present disclosure may include a motion recognition unit 102, a virtual screen display unit 104, an object recognition unit 106, and an object display unit 108.

First, in accordance with a first embodiment of the present disclosure, one representative character (e.g., 'ㄱ', etc.) may be matched to each finger, and a group of characters including at least one-character object (e.g., characters that follow the representative character in a dictionary order) may be matched to each representative character.

For example, in the case of Korean input, the representative character 'ㄱ' may be matched to the 1st finger of the left hand, and the remaining consonants (ㄴ, ㄷ, ㄹ, ㅁ, ㅂ, ㅅ, ㅇ, ㅈ that follow in a dictionary order) may be matched as the character object. In addition, the representative character 'ㅏ' may be matched to the 2nd finger of the left hand, and the remaining vowels (ㅓ, ㅗ, ㅜ, ㅡ, ㅣ) that follow in a dictionary order) may be matched to the representative character as the character object.

In addition, aspirated and unaspirated consonants or middle vowels may be matched to the 3rd finger of the left hand. Accordingly, when the previously expressed character is a consonant, it may be matched as the aspirated and unaspirated consonants, and when the previously displayed character is a vowel, it may be matched as the middle vowels.

And, the number '1' may be matched to the 4th finger of the left hand as a representative character, and the remaining numbers (2, 3, 4, 5, 6, 7, 8, 9, 0) may be matched to the representative character as a character object. In addition, the function key 'space function' may be matched to the 5th finger of the left hand as a representative character, and the remaining function keys (e.g., back space, enter, shift, capslock and the like) and symbols may be matched to the representative character.

Meanwhile, in the case of English input, a representative character 'a' may be matched to the 1st finger of the left hand, and some character objects (e.g., b, c, d, e, f, g, h characters that follow in a dictionary order) may be matched to the representative character.

In addition, a representative character 'i' may be matched to the 2nd finger of the left hand, and some character objects (e.g., j, k, l, m, n, o, p, q characters that follow in a dictionary order) may be matched to the representative character.

Also, a representative character 'r' may be matched to the 3rd finger of the left hand, and some character objects (e.g., s, t, u, v, w, x, y, z characters that follow in a dictionary order) may be matched to the representative character.

And, the numbers, symbols, function keys may be matched to the 4th and 5th fingers of the left hand, as in Korean input.

In addition, one of the objects in each column constituting a qwerty keyboard, not the dictionary order, may be matched to each finger as each representative object. Groups of objects including the remaining objects in each column may be matched to each representative object, respectively.

Meanwhile, in accordance with a second embodiment of the present disclosure, a representative object of the character and a representative object of the function key may be respectively matched to each finger, the character group including the remaining character objects may be matched to the representative object of the character. In addition, the function key group including the remaining function key objects may be matched to the representative object of the function key.

For example, in the case of Korean input, the 'ㄱ' of the Korean consonant may be matched to the 1st finger of the left hand as a representative object, and the remaining consonants and vowels (remaining objects) that follow in the dictionary order may be matched as the corresponding character objects.

Meanwhile, when inputting an alphabetic character, 'a' may be matched to 2nd finger of the left hand as a representative object, and the remaining objects b to z that follow in a dictionary order may be matched as the character objects corresponding to the representative object.

In addition, it is possible to increase the efficiency of input by placing frequently used function keys (e.g., + key: Korean aspirated consonant, unaspirated consonant, middle vowel conversion key, or shift key: English capital letter lock conversion key) at the center of the circular ring including the character object.

In addition, numbers, symbols, function keys and the like may be matched to the 3rd and 4th fingers of the left hand as in the first embodiment described above.

In this way, Korean and English may be input simultaneously with one hand without conversion keys.

In addition, one of the objects in each column constituting the qwerty keyboard, not the dictionary order, may be matched to each finger as each representative object. Groups of objects including the remaining objects in each column may be matched to each representative object, respectively.

On the other hand, in accordance with a third embodiment of the present disclosure, one of the objects in each column or each row constituting the qwerty keyboard may be matched to each finger as each representative object, and the groups of objects including the remaining objects in each column or each row may be matched to each representative object.

For example, the number '1' may be matched to the left 5th finger as a representative object, and the remaining number objects 2 to 0 may be matched to the number objects corresponding to the representative object in the qwerty keyboard order.

In addition, the character 'ㅂ or q' may be matched to the left 4th finger as a representative object, and the remaining character objects (ㅈ to ㅔ, or w to p) may be matched to the character objects corresponding to the representative object in the qwerty keyboard order.

Similarly, the character 'ㅁ or a' may be matched to the left 3rd finger as a representative object, and the remaining character objects (ㄴ to ㅣ, or s to l) may be matched to the character objects corresponding to the representative object in the qwerty keyboard order.

In addition, the character 'ㅋ or z' may be matched to the left 2nd finger as a representative object, and the remaining character objects (ㅌ to ― or x to m) may be matched as the remaining character objects corresponding to the representative object in the qwerty keyboard order.

And, the function key 'shift function' may be matched to the left 1st finger as a representative object (a representative function key object), and the remaining function key objects (e.g., space, back space, enter, capslock and the like) may be matched as the function key objects corresponding to the representative object in the qwerty keyboard order.

Alternatively, each representative character (e.g., 'ㄱ', etc.) may be matched to each finger instead of one of the objects in each column constituting the qwerty keyboard, and a character group including one or more character objects (e.g., a character that follows in the dictionary order, etc) may be matched to each representative character.

On the other hand, in accordance with a fourth embodiment of the present disclosure, one of the objects in a part of each row (for example, half the object of each row) constituting the qwerty keyboard may be matched to each finger of the left hand as each representative object, groups of objects including the remaining objects of the part of the objects in each row may be matched to each representative object, one of the objects of the other part of each row constituting the qwerty keyboard may be matched to each finger of the right hand as each representative object, and groups of objects including the remaining objects among objects of the other part in each row may be matched to each representative object.

That is, the character recognition method in accordance with the fourth embodiment is a service model that may input characters with both hands using a hologram image having a qwerty keyboard configuration.

For example, a number object 1 may be matched to the left 5th finger as a representative object, and the remaining number objects 2 to 5 of one part in the qwerty keyboard order may be matched to the number objects corresponding to the representative object, the number object 6 may be matched to the right 5th finger as a representative object, and the remaining number objects 7 to 0 of the other part in the qwerty keyboard order may be matched to the number objects corresponding to the representative object.

And, in a similar manner, the remaining left and right fingers (left and right 4th to 1st fingers) may be respectively matched to representative objects and the remaining objects corresponding to the representative object by dividing each column of the qwerty keyboard into approximately half.

Alternatively, characters (e.g., 'ㄱ', etc.), not one of the objects of each column constituting the qwerty keyboard, may be respectively matched to fingers as representative characters and character groups each including one or more character objects (e.g., characters that follow the corresponding representative character in a dictionary order) may be respectively matched to the representative characters.

Referring back to FIG. 1, the motion recognition unit 102 may detect whether a specific finger of each user's finger moves (for example, bending of a finger, extending of a finger, etc.) in a three-dimensional space (hologram image), or a function (motion recognition function), such as detecting whether the specific finger drag occurs may be provided. To this end, for example, it may include a camera sensor, an ultrasonic sensor, infrared sensor three-dimensional motion recognition, gyroscope sensor, multi-hovering and the like.

Next, the virtual screen display unit 104, in accordance with the first embodiment of the present disclosure, when a first movement (for example, the bending movement of the finger) of the specific finger may be detected, a specific representative character matching the specific finger may be centered, and a hologram image having a form in which a plurality of character objects belonging to a specific character group matched to the specific representative character may be arranged, thereby it is possible to provide a function such as displaying on the space.

Figure 3:
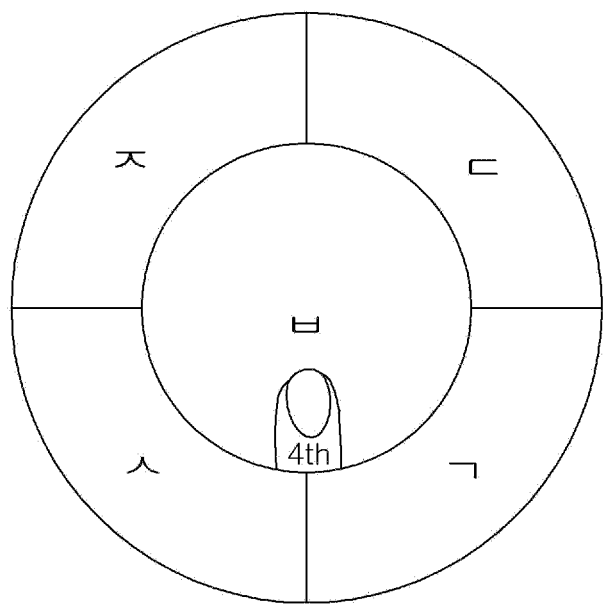
FIG. 3 is an exemplary screen view illustrating an example of inputting a Korean character in conformance with a hologram-based qwerty keyboard order performed in accordance with the first embodiment of the present disclosure.

By way of an example, as shown in FIG. 3, assuming that the representative character matched to the 4th finger of the left hand is 'ㅂ' of the Korean consonant, a hologram image in which a character object of 'ㄱ, ㄷ, ㅈ, ㅅ' in ㅂ column of the qwerty keyboard around 'ㅂ' is arranged may be displayed in an arbitrary space.

Figure 4:
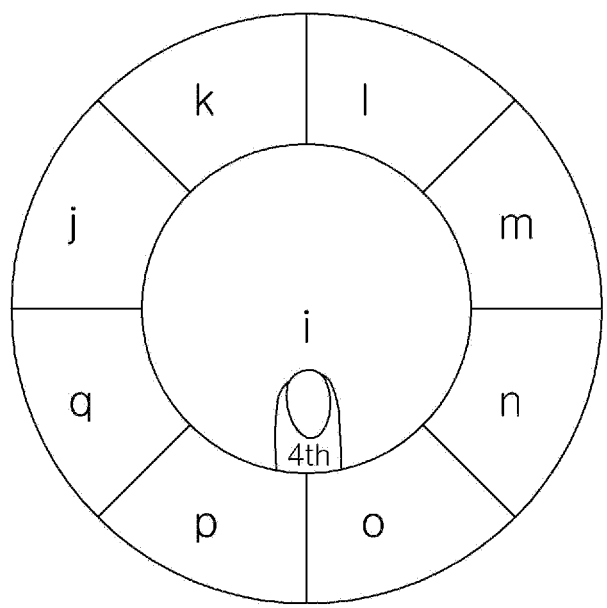
FIG. 4 is an exemplary screen view illustrating an example of inputting an alphabetic character in a hologram-based dictionary order performed in accordance with the first embodiment of the present disclosure.

As another example, as shown in FIG. 4, assuming that the representative character matched to the 4th finger of the left hand is 'i' in English, a hologram image in which a character object of 'j, k, l, m, n, o, p, q' that follows in the dictionary order is arranged may be displayed in an arbitrary space.

In addition, in accordance with the second embodiment of the present disclosure, when a first movement (e.g., bending movement of the finger) of the specific finger is detected, the virtual screen display unit 104 may provide functions such as generating a hologram image and displaying the hologram image in a space. In the hologram image, a specific representative object matched to the specific finger is arranged at the center and a plurality of annular rings are arranged around the specific representative object. Further, each of the annular ring is radially divided to have a plurality of sections so that the remaining objects corresponding to the specific representative object are arranged in the plurality of sections.

Figure 6:
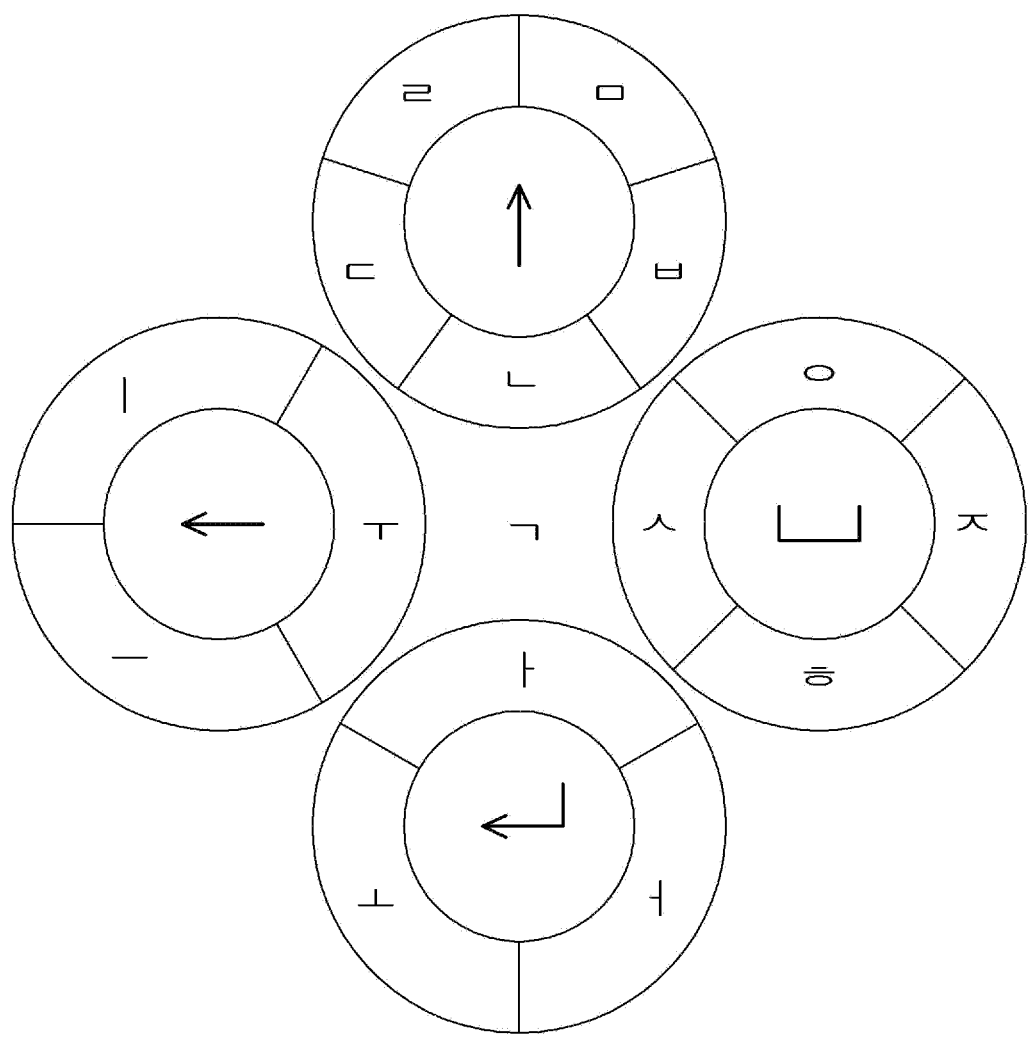
FIG. 6 is an exemplary screen view illustrating an example of a hologram-based Korean character input performed in accordance with the second embodiment of the present disclosure.

As an example, as shown in FIG. 6, assuming that the representative object matched to a specific finger is 'ㄱ' of Korean consonants, the hologram image in which four annular rings are arranged around the 'ㄱ', and the other consonants and vowels placed in the sections of the annular rings may be displayed in an arbitrary space.

Figure 7:
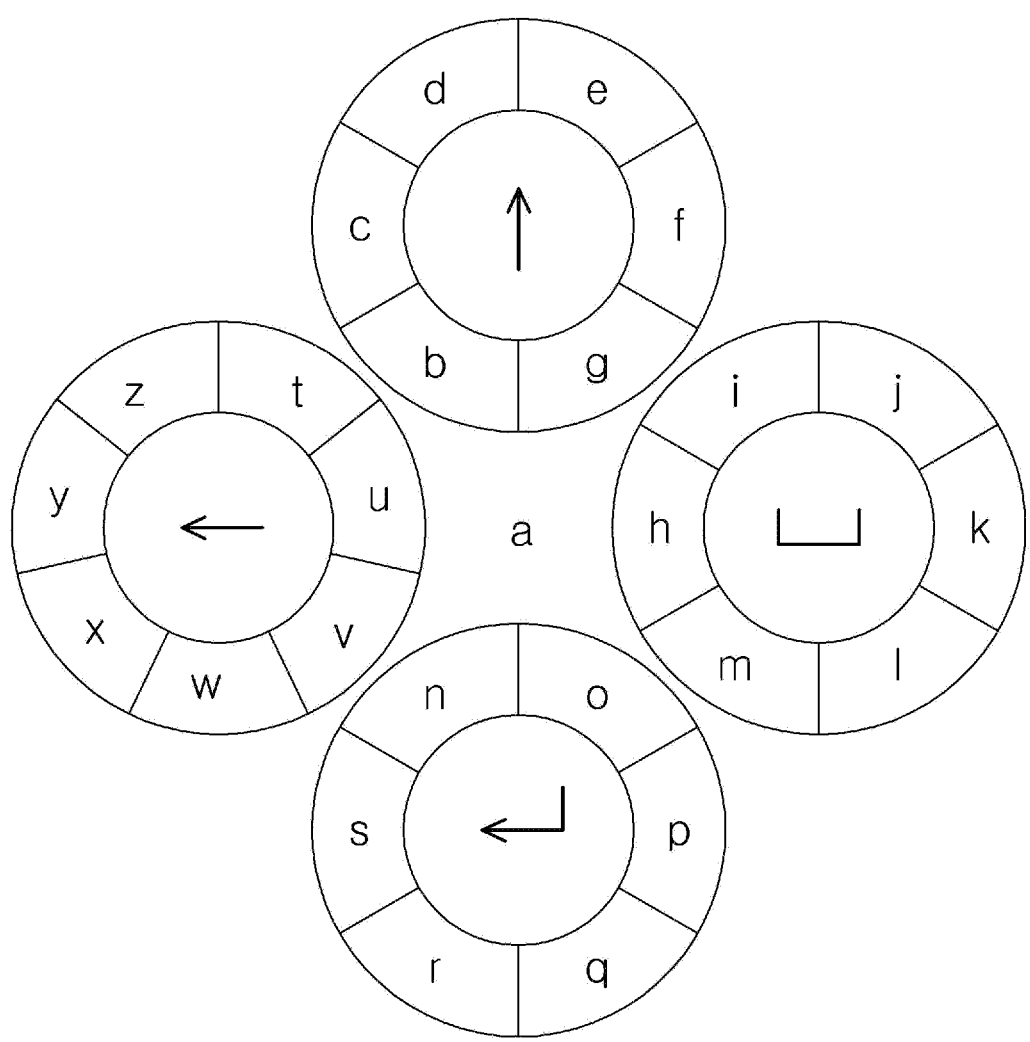
FIG. 7 is an exemplary screen view illustrating an example of a hologram-based alphabetic character input performed in accordance with the second embodiment of the present disclosure.

As another example, as shown in FIG. 7, assuming that the representative object matched to the specific finger is 'a' in English, a hologram image including four annular rings around 'a' to place different English characters in the sections of the annular rings may be displayed on an arbitrary space.

In addition, in accordance with the third embodiment of the present disclosure, when a first movement of a specific finger (e.g., a bending movement of a finger) is detected, the virtual screen display unit 104 may provide functions of generating a hologram image in which a specific representative object matched to the specific finger (a representative object in each column (horizontal structure) or each row (vertical structure) constituting a qwerty keyboard) and a plurality of objects belonging to a group of objects matched to the specific representative object may be arranged in the form of the qwerty keyboard and displaying the same in a space.

Figure 9:
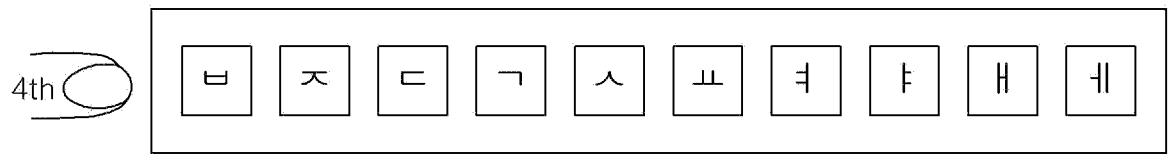
FIGS. 9 and 10 are exemplary screen views showing an example of a qwerty character input in a hologram-based horizontal direction performed with one hand in accordance with the third embodiment of the present disclosure.

As an example, as shown in FIG. 9, assuming that the representative object matched to the 4th finger of left hand is 'ㅂ' of the second row from the top of the qwerty keyboard, a hologram image in which the objects of the row including 'ㅂ' are arranged in a row structure (a horizontal direction structure) of the qwerty keyboard may be displayed on an arbitrary space.

Figure 10:
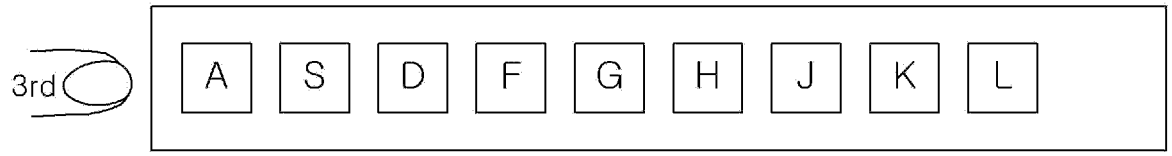

As another example, as shown in FIG. 10, assuming that the representative object matched to the 3rd finger of the left hand is 'A' in the third row from the top of the qwerty keyboard, a hologram image in which the objects in the third row are arranged in a row structure of the qwerty keyboard may be displayed on an arbitrary space.

Figure 11:
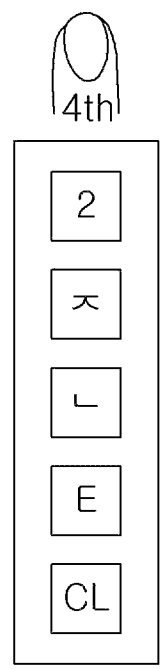
FIG. 11 is an exemplary screen view illustrating an example of a qwerty character input in a hologram-based vertical direction performed in accordance with the third embodiment of the present disclosure.
Figure 13:
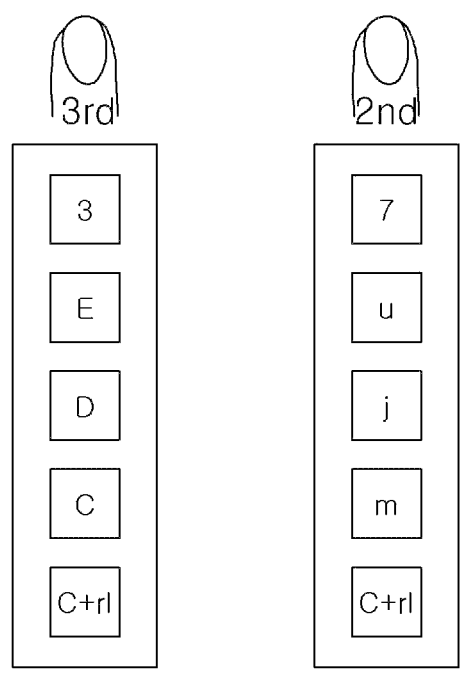
FIG. 13 is exemplary screen views illustrating examples of inputting a qwerty character in a hologram-based vertical direction performed with both hands in accordance with the fourth embodiment of the present disclosure.

As still another example, as illustrated in FIGS. 11 and 13, a hologram image having a column structure (vertical structure) of a qwerty keyboard by matching the column structure of the qwerty keyboard to each finger of the left and right hands may also be applied to be displayed in an arbitrary space.

That is, FIG. 11 shows a group of objects in a column structure of a qwerty keyboard matched to the left 4th finger, where the number '2' may be defined as a representative object.

Meanwhile, in accordance with the fourth embodiment of the present disclosure, when a first movement of the specific finger (bending movement of the finger) is detected, the virtual screen display unit 104 may provide functions of generating a hologram image in which the specific representative object and a plurality of objects belonging to the group of objects (a group of objects matched to each finger of the left hand or group of objects matched to each finger of the right hand) matched to the specific representative object are arranged in a row structure, and displaying the same in a space.

Figure 12:
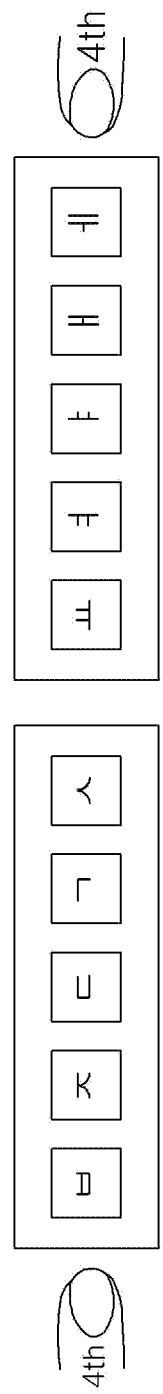
FIG. 12 is an exemplary screen view illustrating an example of a qwerty character input in a hologram-based horizontal direction performed with both hands in accordance with a fourth embodiment of the present disclosure.

As an example, the left figure illustrated in FIG. 12 is a group of objects matched to the 4th finger of the left hand, where the consonant 'ㅂ' may be defined as a representative object, and the right figure illustrated in FIG. 12 is a group of objects matched to the 4th finger of the right hand, where the vowel 'ㅛ' may be defined as the representative object, and FIG. 13 shows a group of objects in the column structure of the qwerty keyboard matched to the 2nd finger of the right hand, where the number '7' may be defined as the representative object.

Referring back to FIG. 1, in accordance with various embodiments of the present disclosure, the object recognition unit 106 may provide functions such as recognizing the specific representative character (or the specific representative object) as an input when a second movement (for example, the spreading movement of the finger) of the specific finger is detected through the motion recognition unit 102, and recognizing one character object as an input when the second movement (for example, the spreading movement of the finger) of the specific finger after the specific finger is dragged or moved to one of the plurality of character objects is detected by the motion recognition unit 102.

And, the object display unit 108 may provide functions such as visually displaying a specific representative character (specific representative object) or a one-character object recognized by the object recognition unit 106 on a character output area arranged in a predetermined portion (e.g., predetermined positions on the top, bottom, left and right of the hologram image) of the hologram image.

Hereinafter, the main process of recognizing the characters based on the hologram in accordance with various embodiments using the character recognition apparatus of the present embodiment having the above-described configuration will be described in detail.

First Embodiment

Figure 2:
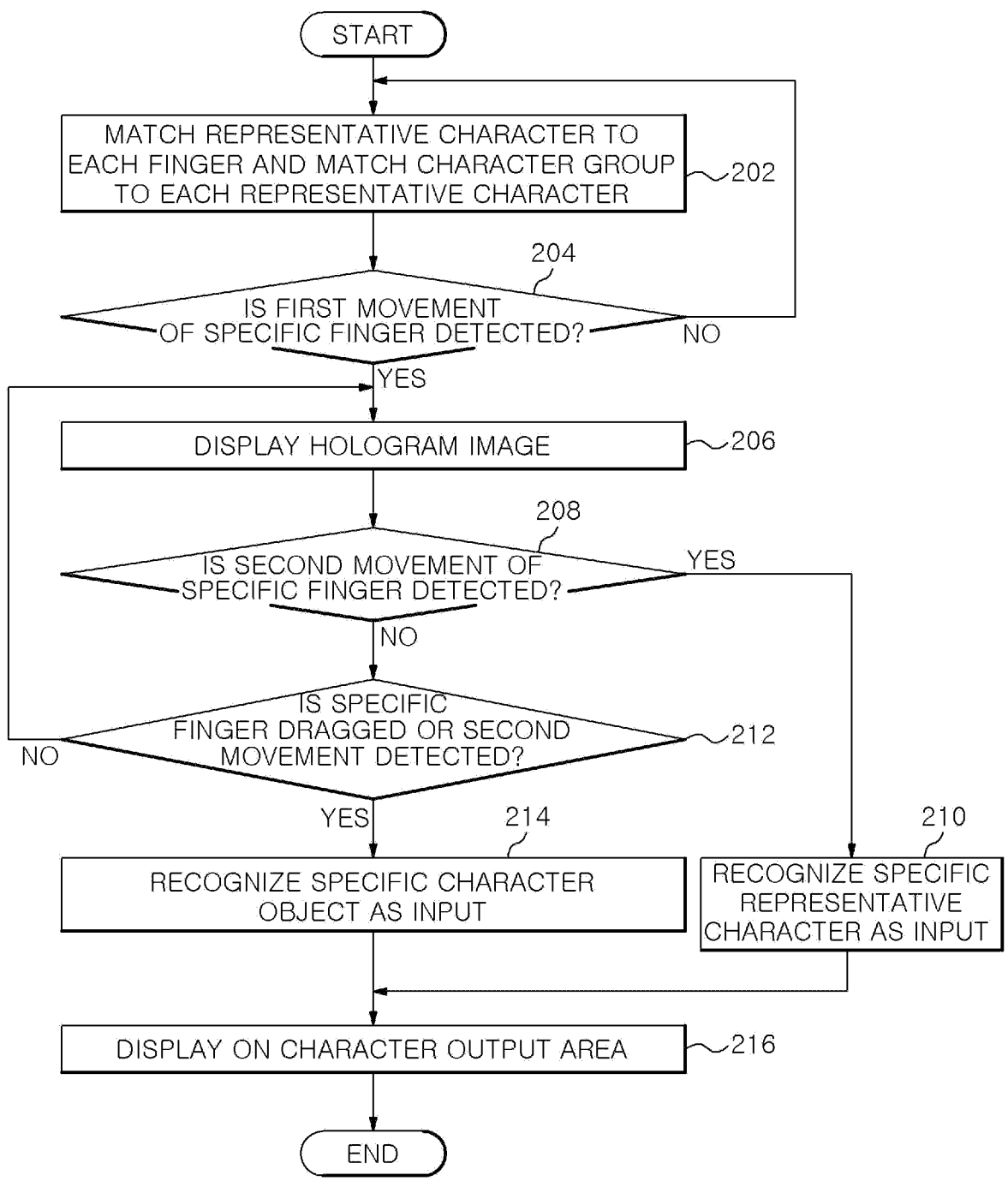
FIG. 2 is a flowchart illustrating a main process of performing character recognition based on a hologram in accordance with a first embodiment of the present disclosure.

FIG. 2 is a flowchart illustrating a main process of performing character recognition based on a hologram in accordance with the first embodiment of the present disclosure; FIG. 3 is a diagram illustrating an example of inputting a Korean character in conformance with a hologram-based qwerty keyboard order performed in accordance with the first embodiment of the present disclosure; and FIG. 4 is an exemplary screen view illustrating an example of inputting an alphabetic character in a hologram-based dictionary order performed in accordance with the first embodiment of the present disclosure;

In accordance with the first embodiment, each representative character may be matched to each finger (e.g., 'ㄱ', etc.), and a character group including at least one character object (e.g. character that follows the representative character in a dictionary order, etc.) may be matched to each representative character (step 202).

As an example, as shown in FIG. 3, the 'ㅂ' of the Korean consonant of the qwerty keyboard is matched to the 4th finger of the left hand as the representative character, and a character group consisting of character objects of 'ㄱ, ㄷ, ㅈ, ㅅ' may be matched to the representative character 'ㅂ' in order from the left sequentially.

Next, the motion recognition unit 102 detects whether a first movement (e.g., a bending movement of the specific finger) of a specific finger of the user's fingers occurs in a three-dimensional space (hologram image) (step 204).

If it is determined in the step 204 that the first movement of the specific finger is detected, as an example, as shown in FIGS. 3 and 4, the virtual screen display unit 104 may generate a hologram image in which a specific representative object matched to a specific finger is arranged at the center and a plurality of character objects belonging to a specific character group matched to the specific representative character are arranged around the specific representative object, and display the hologram image in the space (step 206).

Thereafter, the motion recognition unit 102 checks whether a second movement of the specific finger (e.g., the spreading movement of the specific finger) is detected (step 208). Here, when the second movement of the specific finger is detected as a result of the check, the object recognition unit 106 may recognize a specific representative character (e.g., 'ㅂ' in FIG. 3 and 'i' in FIG. 4) matched to the specific finger, as an input (step 210). As a result, the object display unit 108 may visually display the specific representative character recognized as an input on a character output area arranged in a predetermined portion (for example, a predetermined position in the top, bottom, left, and right of the hologram image, etc.) of the hologram image (step 216).

If it is determined in the step 208 that the second movement of the specific finger is not detected, it is checked whether the second movement of the specific finger is detected after the specific finger is dragged or moved to one of the plurality of character objects (for example, 'ㄷ' in FIG. 3) matched to the representative character of the specific finger (step 212).

As a result of the check in the step 212, if it is determined that the second movement after the specific finger is dragged or moved to one of the plurality of character objects (e.g., 'ㄷ' of FIG. 3) is detected, the object recognition unit 106 may recognize the one-character object as an input (step 214). As a result, the object display unit 108 may visually display the one-character object recognized as an input on a character output area arranged in a predetermined portion of the hologram image (e.g., a predetermined position in the top, bottom, left, right, etc. of the hologram image) (step 216).

That is, in accordance with the first embodiment of the present disclosure, the character (object) may be input in such a way that the representative character is recognized as an input when a user spreads the corresponding finger after bending the finger to which a desired representative character is matched, and the character object is recognized as an input, when the user spreads the corresponding finger, after the user drags or moves the bent finger to the position of the desired character object in the character group.

In addition, in accordance with the first embodiment of the present disclosure, the function keys of the 1st finger (first auxiliary input device) may be designed to change to one mode in which when entering Korean and English, if the 1st finger (first auxiliary input device) is bent and straighten, a function of space is performed, if the 1st finger is spread after moving to the right in a bent state, a function of backspace is performed, if the 1st finger is spread after moving to the left, a function of enter is performed, if the 1st finger is spread after moving to the upward, a function of shift key is performed, and if the 1st finger is spread after moving to the downward, a function of editing is performed, Further, it is possible to provide visual aids to a user by indicating that the input is recognized through a change in color (e.g., red or blue) or a change in unevenness when the second movement detected in the generated hologram.

Second Embodiment

Figure 5:
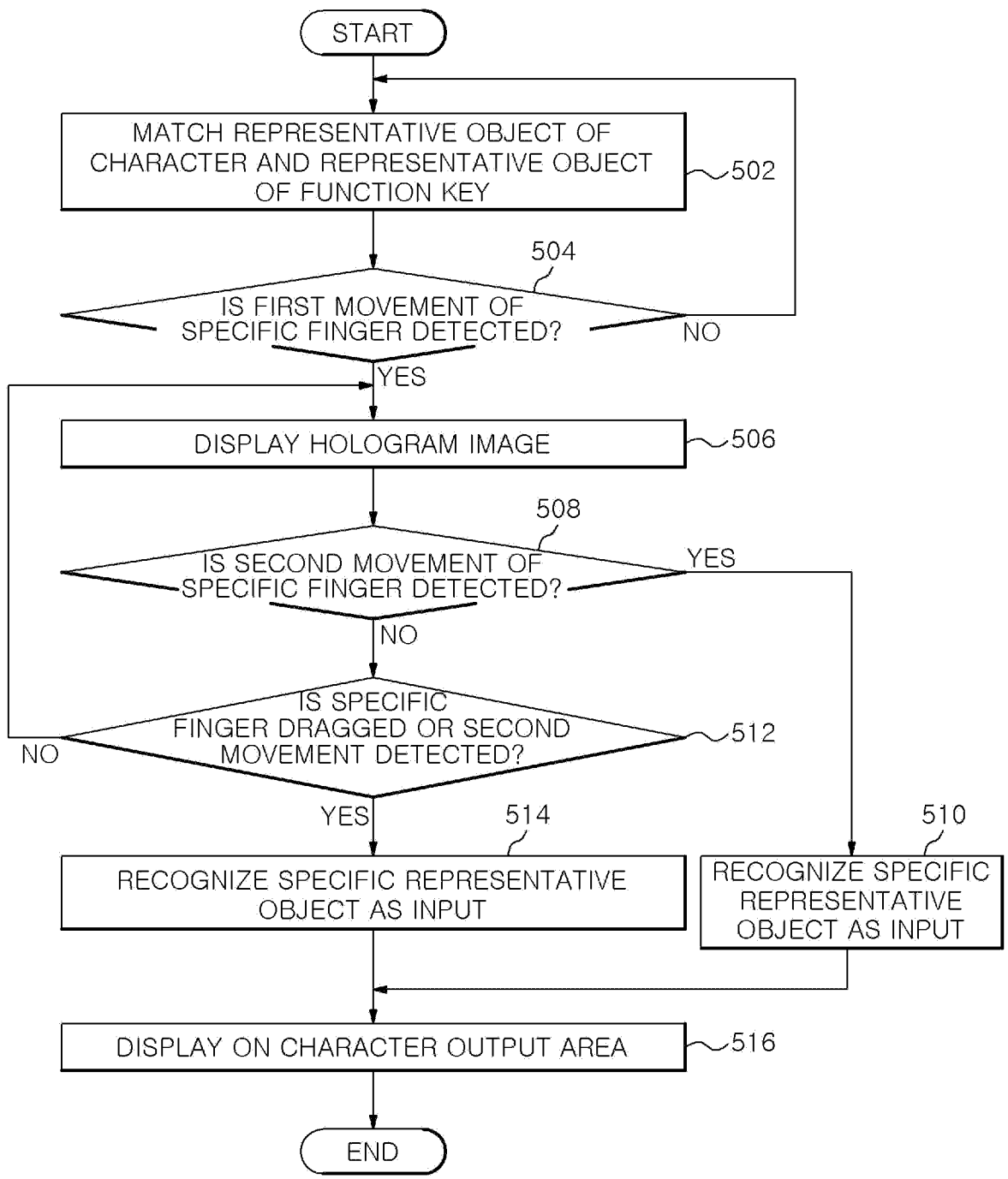
FIG. 5 is a flowchart illustrating a main process of performing character recognition based on a hologram in accordance with a second embodiment of the present disclosure.

FIG. 5 is a flowchart illustrating a main process of performing character recognition based on a hologram in accordance with the second embodiment of the present disclosure; FIG. 6 is an exemplary screen view illustrating an example of a hologram-based Korean character input performed in accordance with the second embodiment of the present disclosure; and FIG. 7 is an exemplary screen view illustrating an example of a hologram-based alphabetic character input performed in accordance with the second embodiment of the present disclosure.

In accordance with the second embodiment of the present disclosure, the representative object of the character and the representative object of the function key may be respectively matched to fingers, the character group including the remaining objects may be matched to the representative object of the character, and a group of function keys including the remaining function key objects may be matched to the representative object of the function key (step 502).

Herein, the hologram image may be displayed in a form in which a specific representative object matched to a specific finger is arranged at the center, a plurality of annular rings are disposed to surround the specific representative object and the remaining objects corresponding to the specific representative object are arranged in sections of the annular rings.

As an example, as shown in FIG. 6, the 'ㄱ' of a Korean consonant may be matched to a specific finger as a representative character, and the remaining consonants and vowels may be matched to a character group of character objects. As another example, 'a' in English may be matched to a specific finger as a representative character, and the remaining English alphabets may be matched to a character group of character objects, as shown in FIG. 7.

Next, the motion recognition unit 102 detects whether a first movement of the specific finger of each finger of the user (e.g., a bending movement of the specific finger) occurs in the three-dimensional space (hologram image) (step 504).

As a result of the check in step 504, if it is determined that the first movement of the specific finger is detected, as an example, as shown in FIGS. 6 and 7, the virtual screen display unit 104 may generate a hologram image in which a specific representative object matched to the specific finger is arranged at the center and a plurality of (e.g., four) annular rings are arranged around the specific representative object and the remaining objects corresponding to the specific representative object are arranged in sections of the annular rings, and displays the hologram image in a space (step 506).

Thereafter, the motion recognition unit 102 checks whether a second movement of the specific finger (the spreading movement of the specific finger) is detected (step 508). Here, when the second movement of the specific finger is detected as a result of the check, the object recognition unit 106 may recognize a specific representative character (e.g., 'ㄱ' in FIG. 6 and 'a' in FIG. 7, etc.) matched to the specific finger, as an input. (step 510). As a result, the object display unit 108 may visually display the specific representative character recognized as the input on a character output area arranged in a predetermined portion (for example, a predetermined position in the top, bottom, left, and right of the hologram image, etc.) of the hologram image (step 516).

If it is determined in the step 508 that the second movement of the specific finger is not detected, it is checked whether the second movement of the specific finger is detected after the specific finger is dragged or moved to one of the plurality of character objects (for example, 'ㅜ' in FIG. 6) matched to the representative character of the specific finger (step 512).

As a result of the check in the step 512, if it is determined that the second movement is detected after the specific finger is dragged or moved to one of the plurality of character objects (e.g., 'ㅜ' of FIG. 6), the object recognition unit 106 may recognize a one-character object as an input (step 514). As a result, the object display unit 108 may visually display the one-character object recognized as an input on a character output area arranged in a predetermined portion of the hologram image (e.g., a predetermined position in the top, bottom, left, right, etc. of the hologram image (step 516).

That is, in accordance with the second embodiment of the present disclosure, a desired representative character is recognized as an input when a user spreads the finger after bending the finger in a state that the desired representative character is matched. Further, when the user drags or moves the bent finger to the position of a desired object in the character group and spreads the finger, the desired object is recognized as an input.

Further, it is possible to provide visual aids, instead of touch, to a user by indicating that the input is recognized through a change in color (e.g., red or blue) or a change in unevenness when the second movement detected in the generated hologram.

Third Embodiment

Figure 8:
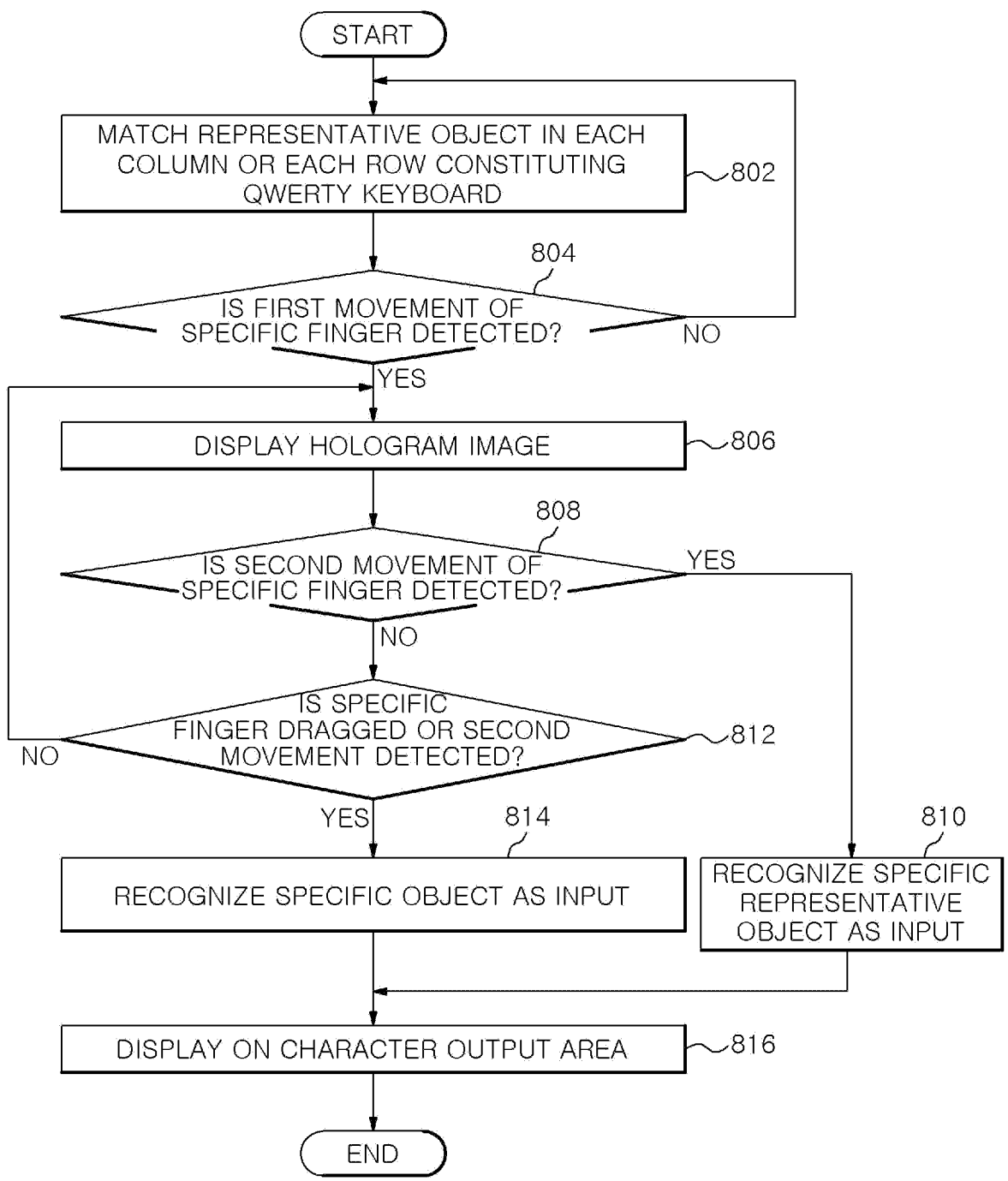
FIG. 8 is a flowchart illustrating a main process of performing character recognition based on a hologram in accordance with a third embodiment of the present disclosure.

FIG. 8 is a flowchart illustrating a main process of performing character recognition based on a hologram in accordance with the third embodiment of the present disclosure; FIGS. 9 and 10 are exemplary screen views showing an example of a qwerty character input in a hologram-based horizontal direction performed with one hand in accordance with the third embodiment of the present disclosure; and FIGS. 11 and 12 are exemplary screen views illustrating an example of a qwerty character input in a hologram-based vertical direction performed in accordance with the third embodiment of the present disclosure.

In accordance with the third embodiment of the present disclosure, one of the objects in each column or each row constituting the qwerty keyboard is matched as each representative object to each finger, and groups of objects including the remaining objects in each column or row may be matched to each representative object (step 802)

As an example, the second row from the top of the qwerty keyboard may be matched to the 4th finger of the left hand in the Korean alphabet input, and a consonant 'ㅂ' may be matched as a representative object of the corresponding row as shown in FIG. 9. As another example, in the English alphabet input, the third row may be matched to the 3rd finger from the top of the qwerty keyboard, and the alphabet 'A' may be matched as the representative object of the row, as shown in 10.

Next, the motion recognition unit 102 detects whether a first movement (e.g., a bending movement of the specific finger) of a specific finger of the user occurs in a three-dimensional space (hologram image) (step 804).

If it is determined in the step 804 that the first movement of the specific finger is detected, as an example, as shown in FIGS. 9 and 10, the virtual screen display unit 104 may generate a hologram image in which a plurality of objects including a specific representative object matched to a specific finger is arranged in the form of the Qwerty keyboard and display the same in the space (step 806).

Thereafter, the motion recognition unit 102 checks whether a second movement of the specific finger (the spreading movement of the specific finger) is detected (step 808). Here, when the second movement of the specific finger is detected as a result of the check, the object recognition unit 106 may recognize a specific representative character (e.g., 'ㅂ' in FIG. 9 and 'A' in FIG. 10) matched to the specific finger, as an input. (step 810). As a result, the object display unit 108 may visually display a specific representative character recognized as the input on a character output area arranged in a predetermined portion (for example, a predetermined position in the top, bottom, left, and right of the hologram image, etc.) of the hologram image (step 816).

If it is determined in the step 808 that the second movement of the specific finger is not detected, it is checked whether the second movement of the specific finger is detected after the specific finger is dragged or moved to one of the plurality of character objects (for example, 'ㅖ' in FIG. 9) matched to the representative object of the specific finger (step 812).

As a result of the check in the step 812, if it is determined that the second movement is detected after the specific finger is dragged or moved to one object of the plurality of objects (e.g., 'ㅖ' of FIG. 9), the object recognition unit 106 may recognize the one object as the input (step 814). As a result, the object display unit 108 may visually display the one object recognized as the input on a character output area arranged in a predetermined portion of the hologram image (e.g., a predetermined position in the top, bottom, left, right, etc. of the hologram image (step 816).

That is, in accordance with the third embodiment of the present disclosure, a desired representative character is recognized as an input when a user spreads the finger after bending the finger in a state that the desired representative character is matched. Further, when the user drags or moves the bent finger to the position of a desired object in the character group and spreads the finger, the desired object is recognized as an input.

Further, it is possible to provide visual aids, instead of touch, to a user by indicating that the input is recognized through a change in color (e.g., red or blue) or a change in unevenness when the second movement detected in the generated hologram.

Meanwhile, in accordance with the third embodiment of the present disclosure, as an example, as illustrated in FIGS. 11 and 13, it is possible to display a hologram image in an arbitrary space in the form of a column structure (vertical structure) of a qwerty keyboard by matching the column structure of the qwerty keyboard to each finger of the left and right hands.

FIG. 11 illustrates a group of objects in a column structure of a qwerty keyboard matched to a left 4th finger, where the number '2' may be defined as a representative object in the corresponding column structure.

Fourth Embodiment

In accordance with the fourth embodiment of the present disclosure, one of the objects in a part of each column (the left part of each column of the qwerty keyboard) constituting the qwerty keyboard may be matched to each finger of the left hand as each representative object and the groups of objects including the remaining objects among the objects in the part of each column may be matched to each representative object, and one of the objects of the other part of each column (the right part of each column of the qwerty keyboard) constituting the qwerty keyboard may be matched to each finger of the right hand as each representative object and the groups of objects including the remaining objects among the objects of the other part of each column may be matched to each representative object.

FIG. 12 is an exemplary screen view illustrating an example of a qwerty character input in a hologram-based horizontal direction performed with both hands in accordance with the fourth embodiment of the present disclosure.

Referring to FIG. 12, the left figure of the drawing may be a group of objects matched to the 4th finger of the left hand, the consonant 'ㅂ' may be defined as a representative object, and the right figure of the drawing may be a group of objects matched to the 4th finger of the right hand, a vowel 'ㅛ' be defined as a representative object.

That is, in accordance with the fourth embodiment of the present disclosure, when the first movement of the finger (bending movement of the finger) is detected, the virtual screen display unit 104 may display in space a hologram image in which a plurality of objects belonging to a specific representative object and a group of objects (a group of objects matched to each finger of the left hand or group of objects matched to each finger of the right hand) matched to the specific representative object are arranged in a row structure of a qwerty keyboard.

FIG. 13 illustrates a group of objects in a column structure of a qwerty keyboard matched to the 2nd finger of the right hand, and the number '7' may be defined as a representative object.

Further, it is possible to provide visual aids, instead of touch, to a user by indicating that the input is recognized through a change in color (e.g., red or blue) or a change in unevenness when the second movement detected in the generated hologram.

Thereafter, in accordance with the fourth embodiment of the present disclosure, since the process of inputting the representative object or the desired object by using both hands is substantially the same as in the above-described third embodiment with reference to FIG. 8, the detailed description here is omitted in order to avoid unnecessary duplication for the sake of brevity of the specification.

Combinations of blocks in the flowcharts of the present invention can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

For example, in accordance with an aspect of the present disclosure, there may be provided a computer-readable recording medium having a computer program stored therein for causing a processor to perform a hologram-based character recognition method in which one or more representative characters are respectively matched to one or more fingers and a group of characters including one or more character objects is matched to each of one or more representative characters, the hologram-based character recognition method including: displaying, when a first movement of a predetermined finger among the one or more fingers is detected, in a space a hologram image in which a predetermined representative character among the one or more representative characters matched to the predetermined finger is arranged at a center of the hologram image and the one or more character objects included in the group matched to the predetermined representative character are arranged around the specific representative object; recognizing the predetermined representative character as an input when a second movement of the predetermined finger is detected; and recognizing one of the one or more character objects as an input when the second movement of the predetermined finger is detected after the predetermined finger is dragged or moved to said one of the one or more character objects.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present invention, and it will be understood by those skilled in the art that various changes and modifications can be made without departing from original characteristics of the present invention. Therefore, the embodiments disclosed in the present invention are intended to explain, not to limit, the technical scope of the present invention, and the technical scope of the present invention is not limited by the embodiments.

Therefore, the protection scope of the present invention should be interpreted based on the following claims and it should be appreciated that all technical scopes included within a range equivalent thereto are included in the protection scope of the present invention.

What is claimed is:

1. A hologram-based character recognition method in which one or more representative characters are respectively matched to one or more fingers and a group of characters including one or more character objects is matched to each of the one or more representative characters, the hologram-based character recognition method comprising:
   displaying, when a first movement of a predetermined first finger among the one or more fingers is detected, in a space a hologram image in which a predetermined first representative character among the one or more representative characters matched to the predetermined first finger is arranged at a center of the hologram image and the one or more character objects included in the group matched to the predetermined first representative character are arranged around the predetermined first representative character;
   recognizing the predetermined first representative character as an input when a second movement of the predetermined first finger is detected regardless of a position at which the second movement of the predetermined first finger is detected; and
   recognizing one of the one or more character objects as an input when the second movement of the predetermined first finger is detected after the predetermined first finger is dragged or moved to said one of the one or more character objects,
   wherein, in the displaying, when the first movement of a predetermined second finger different from the predetermined first finger among the one or more fingers is detected, in the space a hologram image in which a predetermined second representative character among the one or more representative characters matched to the predetermined second finger is arranged at the center of the hologram image and one or more character objects included in another group matched to the predetermined second representative character are arranged around the predetermined second representative character, and
   wherein the first movement is a bending movement of the predetermined first finger or the predetermined second finger and the second movement is a spreading movement of the predetermined first finger or the predetermined second finger either of which has been bent.

2. The hologram-based character recognition method of claim 1, further comprising displaying a detection of the second movement by a change of a color or an unevenness of the hologram image when the second movement is detected.

3. The hologram-based character recognition method of claim 1, wherein the hologram image has a circular structure or a rectangular structure.

4. The hologram-based character recognition method of claim 1, wherein one of the predetermined first representative character and the predetermined second representative character, or the one or more character objects matched to one of the predetermined first representative character and the predetermined second representative character recognized as an input is displayed in a character output area arranged in a predetermined portion of the hologram image.

5. The hologram-based character recognition method of claim 1, wherein a representative function key is matched to one of the fingers, and a function key group including at least one function key object is matched to the representative function key.

6. A hologram-based character recognition method in which one or more representative objects including a representative character object and a representative function key object are respectively matched to one or more fingers, a character group including remaining character objects is matched to the representative character object, and a function key group including remaining function key objects is matched to the representative function key object, the hologram-based character recognition method comprising:

displaying in a space a hologram image in which, when a first movement of a predetermined first finger is detected, a predetermined first representative object among the one or more representative objects matched to a predetermined first finger among the one or more fingers is arranged at a center of the hologram image and a plurality of first annular rings are arranged around the predetermined first representative object, and remaining objects corresponding to the predetermined first representative object are arranged in the first annular rings;

recognizing the predetermined first representative object as an input when a second movement of the predetermined first finger is detected regardless of a position at which the second movement of the predetermined first finger is detected; and recognizing one of the remaining objects as the input when the second movement of the predetermined first finger is detected after the predetermined first finger is dragged or moved to said one of the remaining objects, wherein, in the displaying in the space, a hologram image in which, when the first movement of a predetermined second finger is detected, a predetermined second representative object among the one or more representative objects matched to the predetermined second finger among the one or more fingers is arranged at the center of the hologram image and a plurality of second annular rings are arranged around the predetermined second representative object, and remaining objects corresponding to the predetermined second representative object are arranged in the second annular rings, and wherein the first movement is a bending movement of the predetermined first finger or the predetermined second finger and the second movement is a spreading movement of the predetermined first finger or the predetermined second finger either of which has been bent.

7. The hologram-based character recognition method of claim 6, wherein the representative character object includes at least one of a representative object of Korean consonants and a representative object of Korean vowels.

8. The hologram-based character recognition method of claim 6, wherein one of the predetermined first representative character and the predetermined second representative character, or the one of the remaining objects matched to one of the predetermined first representative character and the predetermined second representative character recognized as the input is displayed in a character output area arranged in a predetermined portion of the hologram image.

9. A hologram-based character recognition method in which one or more objects in each column or each row constituting a qwerty keyboard are respectively matched to one or more fingers as representative objects, and groups of objects including the remaining objects in each column or each row are respectively matched to the representative objects, the hologram-based character recognition method comprising:

displaying, when a first movement of a predetermined first finger is detected, in a space, a hologram image in which a predetermined first representative object matched to the predetermined first finger and a plurality of objects belonging to a group of objects matched to the predetermined first representative object are arranged in the form of the qwerty keyboard;

recognizing the predetermined first representative object as an input when a second movement of the predetermined first finger is detected regardless of a position at which the second movement of the predetermined first finger is detected; and recognizing one of the plurality objects as the input when the second movement of the predetermined first finger is detected after the predetermined first finger is dragged or moved to the one of the plurality objects, wherein, in the displaying, when the first movement of a predetermined second finger is detected, in the space, a hologram image in which a predetermined second representative object matched to the predetermined second finger and a plurality of objects belonging to a group of objects matched to the predetermined second representative object are arranged in the form of the qwerty keyboard, and wherein the first movement is a bending movement of the predetermined first finger or the predetermined second finger and the second movement is a spreading movement of the predetermined first finger or the predetermined second finger either of which has been bent.

10. The hologram-based character recognition method of claim 9, wherein one of the predetermined first representative object and the predetermined second representative character or the one of the plurality objects matched to one of the predetermined first representative character and the predetermined second representative character recognized as the input by the second movement is displayed in a character output area arranged in a predetermined portion of the hologram image.

11. A hologram-based character recognition method in which objects in each row of a qwerty keyboard are respectively divided into a first part and a second part, one object of the first part is matched to one finger of a left hand as a first representative object, a first object group including the other objects of the first part is matched to the first representative object, and one object of the second part is matched to one finger of a right hand as a second representative object, and a second object group including the other objects of the second part is matched to the second representative object, the hologram-based character recognition method comprising:

displaying, when a first movement of a predetermined first finger of the left or right hand is detected, in a space, a hologram image in which a predetermined first representative object among the first representative objects and the second representative objects matched to the predetermined first finger and a plurality of objects belonging to an object group among the first object groups and the second object groups matched to the predetermined first representative object are arranged in the form of the qwerty keyboard;

recognizing the predetermined first representative object as an input when a second movement of the predetermined first finger is detected regardless of a position at which the second movement of the predetermined first finger is detected; and recognizing one object among the plurality of objects as an input when the second movement of the predetermined first finger is detected after the predetermined first finger is dragged or moved to the one object among the plurality of objects, wherein, in the displaying, when the first movement of a predetermined second finger of the left or right hand is detected, in the space, a hologram image in which a predetermined second representative object among the first representative objects and the second representative objects matched to the predetermined second finger and a plurality of objects belonging to an object group among the first object groups and the second object groups matched to the predetermined second representative object are arranged in the form of the qwerty keyboard, and wherein the first movement is a bending movement of the predetermined first finger or the predetermined second finger and the second movement is a spreading movement of the predetermined first finger or the predetermined second finger either of which has been bent.

12. The hologram-based character recognition method of claim 11, wherein one of the predetermined first representative object and the predetermined second representative object or the one object matched to one of the predetermined first representative object and the predetermined second representative object recognized as the input by the second movement is displayed in a character output area arranged in a predetermined portion of the hologram image.

\* \* \* \* \*